(12) United States Patent
Rife

(10) Patent No.: US 6,830,387 B2
(45) Date of Patent: Dec. 14, 2004

(54) MODULAR THERMAL SECURITY CAMERA SYSTEM

(75) Inventor: John L. Rife, Murphy, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/322,123

(22) Filed: Dec. 17, 2002

(65) Prior Publication Data

US 2004/0114919 A1 Jun. 17, 2004

(51) Int. Cl.$^7$ ............... G03B 17/00; H04N 5/225; G01N 21/00; G01V 8/00
(52) U.S. Cl. ............... 396/427; 396/428; 396/429; 396/535; 348/151; 348/372; 348/374; 250/363.02; 250/559.08
(58) Field of Search ............... 396/535, 429, 396/419, 427, 428; 348/373, 143, 374, 372, 207.99, 33, 151; 219/201; 352/243; 250/352, 370.15, 252.1, 363.02, 559.08, 239, 316.1; 361/727, 600

(56) References Cited

U.S. PATENT DOCUMENTS

| 4,485,407 A | * | 11/1984 | Bohm et al. ............... 348/374 |
| 5,115,263 A | * | 5/1992 | Bernhardt et al. .......... 396/535 |
| 5,455,625 A | * | 10/1995 | Englander ................... 348/375 |
| 5,685,636 A | * | 11/1997 | German ...................... 362/259 |
| 6,375,369 B1 | | 4/2002 | Schneider et al. .......... 396/427 |
| 6,392,704 B1 | * | 5/2002 | Garcia-Ortiz ............... 348/373 |
| 6,445,408 B1 | * | 9/2002 | Watkins ...................... 348/148 |
| 2003/0122958 A1 | * | 7/2003 | Olita et al. ................. 348/373 |

FOREIGN PATENT DOCUMENTS

| EP | 0 541 449 A2 | 5/1993 | .......... H04N/5/225 |
| WO | WO 99/07138 | 2/1999 | .......... H04N/5/217 |
| WO | WO 01/10129 A1 | 2/2001 | ............ H04N/7/18 |

OTHER PUBLICATIONS

PCT Notification of Transmittal of the International Search Report for International Application No. PCT/US03/38355, filed Dec. 3, 2003, authorized by Shantisaroop Pherai (6 pages), May 3, 2004.

* cited by examiner

Primary Examiner—Rodney Fuller
Assistant Examiner—Rochelle Blackman
(74) Attorney, Agent, or Firm—Baker Botts L.L.P.

(57) ABSTRACT

According to an embodiment of the present invention, a system includes a camera housing, a first pair of tracks formed on an outside of, and along a length of, the camera housing, a second pair of tracks formed on the outside of, and along the length of, the camera housing, a camera disposed in the camera housing, and an adjustable mounting device that includes a pair of protrusions configured to engage either the first pair or the second pair of tracks and a threaded mounting hole formed therein configured to couple to a mounting screw.

17 Claims, 4 Drawing Sheets

MODULAR THERMAL SECURITY CAMERA SYSTEM

TECHNICAL FIELD OF THE INVENTION

This invention relates in general to security cameras and, more particularly, to a modular thermal security camera system.

BACKGROUND OF THE INVENTION

Security cameras are prevalent in our society today. However, like many other electronic devices, security cameras become outdated and need to be replaced with newer, more advanced security cameras. For example, many existing security cameras, such as closed circuit television cameras, cannot operate in low light or no light conditions.

There are a large number of different security camera mounting schemes used in the security camera industry. Security cameras are mounted with many different enclosures and platforms. Installation typically requires changing the mounting hardware, changing the enclosure or modifying the platform to fit the security camera. These procedures waste time and money.

SUMMARY OF THE INVENTION

According to an embodiment of the present invention, a system includes a camera housing, a first pair of tracks formed on an outside of, and along a length of, the camera housing, a second pair of tracks formed on the outside of, and along the length of, the camera housing, a camera disposed in the camera housing, and an adjustable mounting device that includes a pair of protrusions configured to engage either the first pair or the second pair of tracks and a threaded mounting hole formed therein configured to couple to a mounting screw.

Embodiments of the invention provide a number of technical advantages. Embodiments of the invention may include all, some, or none of these advantages. Old, outdated closed circuit TV cameras may be replaced with new, high-tech thermal security cameras that provide video in all light conditions, including low-light to no-light conditions. Moreover, these security cameras may be physically the same or smaller in size and weight, and may provide plug-and-play capability. More specifically, the thermal security cameras may have flexible mounting devices that facilitate easy installation on most existing platforms and/or mounting schemes, including enclosures. In addition, the thermal security cameras have the same input power requirements and video output as the cameras that are being replaced.

Thermal security cameras in accordance with some embodiments of the present invention may have an extruded camera housing that acts as an ambient heat sink for the detector hardware as well as an EMI shield. In addition, the camera housing may facilitate a water tight seal to shield the camera from the environment. The camera housing has tracks formed therein that work in conjunction with the flexible mounting device mentioned above to provide the adjustability of the camera so that it may fit a myriad of mounting schemes.

Other technical advantages are readily apparent to one skilled in the art from the following figures, descriptions, and claims.

BRIEF DESCRIPTION OF THE DRAWINGS

A better understanding of the present invention is realized from the detailed description that follows, taken in conjunction with the accompanying drawings, in which.

DETAILED DESCRIPTION OF THE INVENTION

Figure 1:
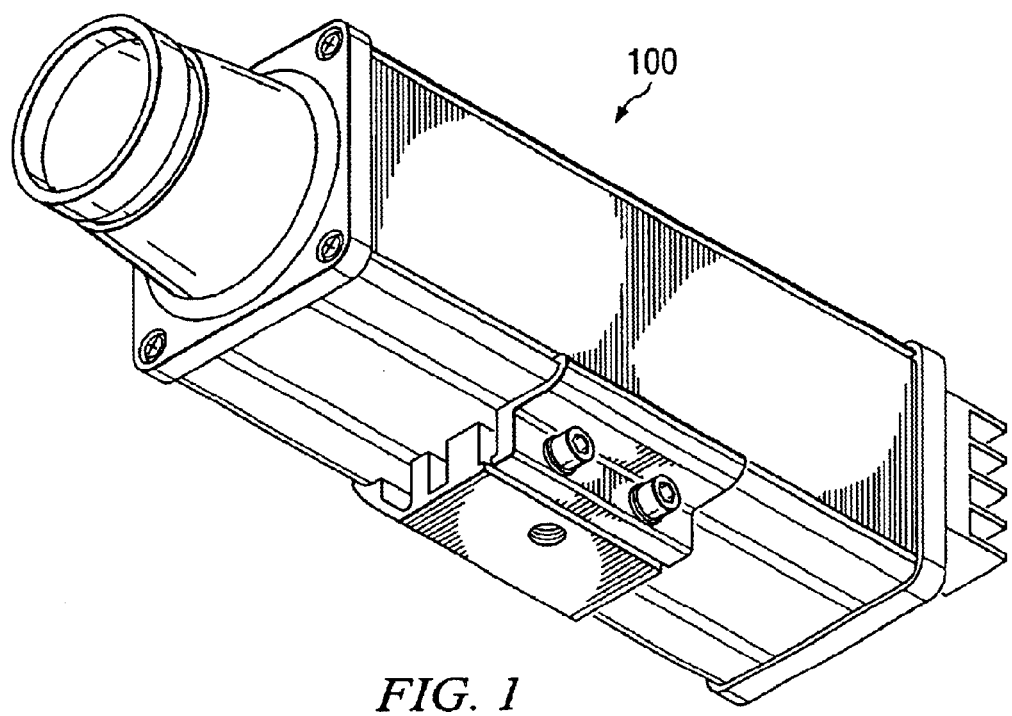
FIG. 1 is a perspective view of a modular thermal security camera in accordance with one embodiment of the present invention.

FIG. 1 is a perspective view of a modular thermal security camera system 100 in accordance with one embodiment of the present invention. Security cameras, in general, are in many public and private places, such as malls, airports, restaurants, and private residences. As technology progresses, existing security cameras need to be replaced by newer, more advanced security cameras. For example, many existing security cameras cannot operate in low light or no light conditions.

There are a large number of different security camera mounting schemes used in the industry. In addition, security cameras are sometimes placed within enclosures, which may further complicate the installation of new security cameras. Changing the mounting hardware or modifying the existing mounting hardware is often a waste of time and, consequently, a waste of money. The present invention addresses this problem, and others, by providing a modular thermal security camera system, such as system 100, that is easily adaptable to many current mounting schemes, platforms and/or enclosures. The elements of thermal security camera system 100 are introduced below in conjunction with FIGS. 2A and 2B, which are front and rear exploded perspective views, respectively, of system 100.

In the embodiment illustrated in FIGS. 2A and 2B, system 100 includes a thermal imaging camera 200 disposed within a camera housing 202, a rear access cover 204 coupled to a rear of camera housing 202, a lens housing 206 having a lens 207 disposed therein coupled to a front of camera housing 202, and a mounting device 210 adjustably coupled to camera housing 202, as described in more detail below. The "front" of camera housing 202 refers to that portion of housing 202 that faces a scene (not explicitly shown) from which infrared radiation is received by camera 200 through lens 207. The "rear" of camera housing 202 refers to that portion of housing 202 opposite the front.

Thermal imaging camera 200 is any suitable thermal imaging camera that is operable to collect electromagnetic radiation within its field of view and convert this electromagnetic radiation into a series of successive images so that electrical signals representing these images may be supplied to a video recorder, a viewing device, or other suitable electronic device. However, thermal imaging camera 200 may be any suitable camera that is operable to detect images within its field of view and record these images in any suitable format. As examples, thermal imaging camera 200 may be a microbolometer, a charge couple device ("CCD"), or other suitable device that can detect electromagnetic radiation. In the illustrated embodiment, thermal imaging camera 200 includes two circuit boards 212, one of which is a processing board and the other of which is a video reformatter. Although thermal imaging camera 200 may be disposed within housing 202 in any suitable manner; in one embodiment, circuit boards 212 slide within and engage a plurality of grooves 214 formed in housing 202.

Housing 202 functions to house thermal imaging camera 200 to protect camera 200 from the environment by providing a water tight seal as well as a shield from any electromagnetic interference. Housing 202 may also act as an ambient heat sink for the detector hardware associated with camera 200. According to the teachings of one embodiment of the present invention, housing 202 includes a first pair of tracks 216 formed on the outside of housing 202 adjacent a first side 217 of housing 202 and a second pair of tracks 218 formed on the outside of housing 202 adjacent a second side 219 of housing 202. As described in more detail below, first pair of tracks 216 and second pair of tracks 218 work in conjunction with mounting device 210 to provide a flexible mounting scheme for camera system 100. Details of tracks 216 and 218 as well as other details of housing 202 are described below in conjunction with FIG. 3A.

Figure 2A:
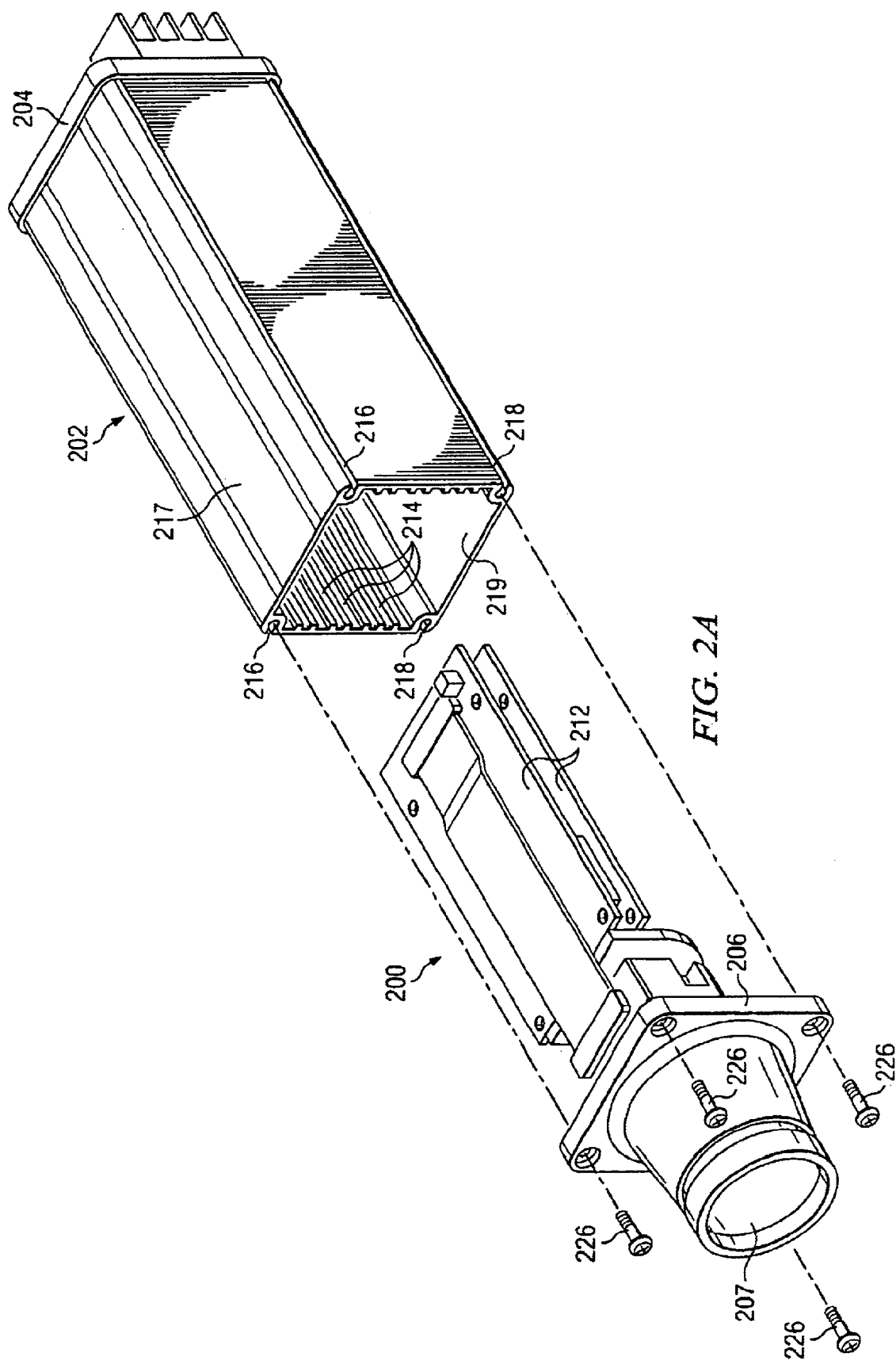
FIG. 2A is a front exploded perspective view of the modular thermal security camera of FIG. 1.
Figure 2B:
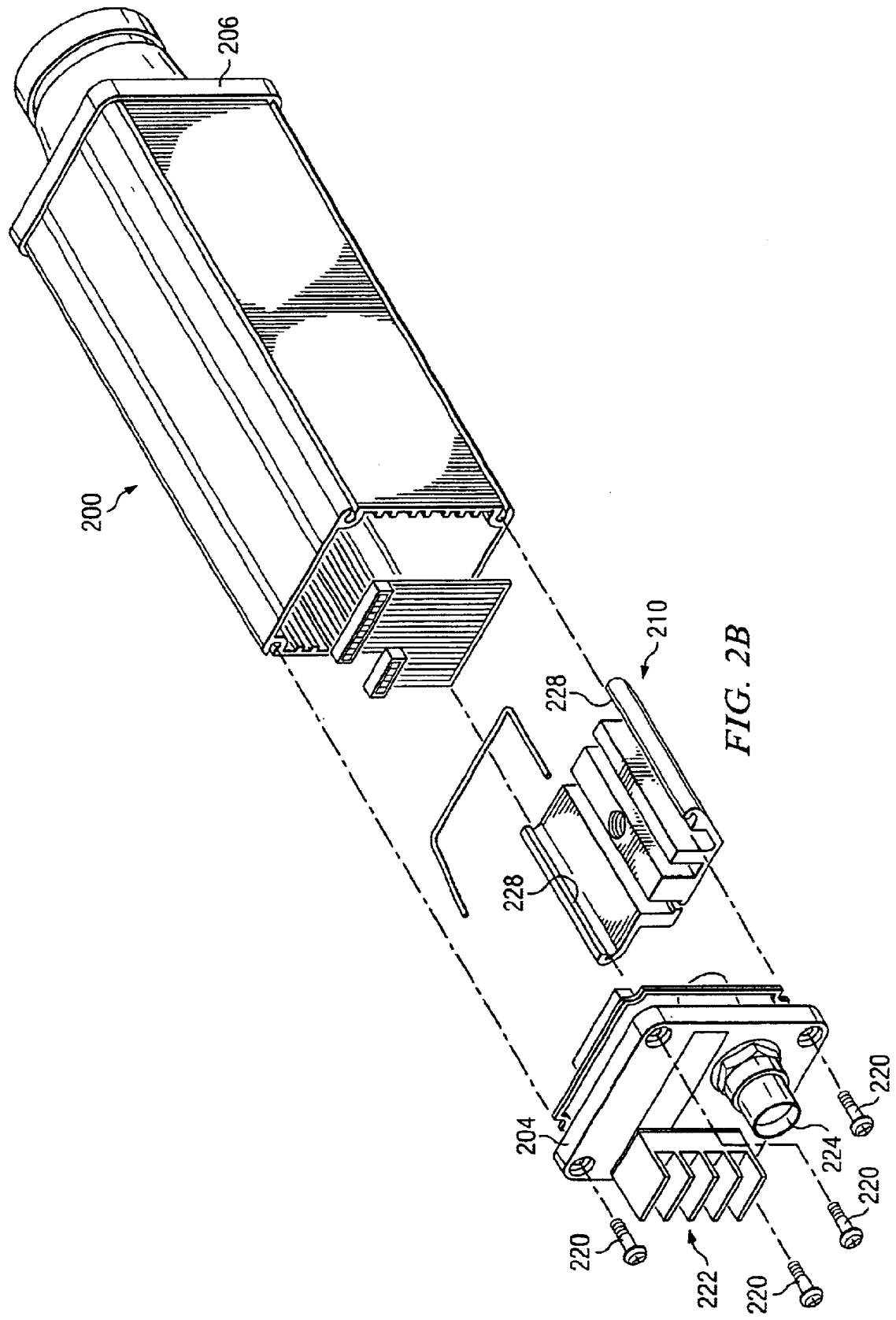
FIG. 2B is a rear exploded perspective view of the modular thermal security camera of FIG. 1.

Referring to FIG. 2B, in the illustrated embodiment, rear access panel 204 includes a twenty-four volt AC power input receptacle 222 coupled thereto that functions to provide power to camera 200 and also includes a BNC connector 224 coupled thereto that functions to provide a video output for camera 200. In a particular embodiment, the video output is an NTSC video output; however, other suitable video outputs may be associated with camera 200 and, accordingly, other suitable connectors may be coupled to rear access cover 204. Rear access panel 204 couples to the rear of housing 202 in any suitable manner; however, in one embodiment, rear access panel 204 is coupled to the rear of housing 202 with a plurality of fasteners 220 coupled to respective tracks of first pair of tracks 216 and second pair of tracks 218. In a particular embodiment, fasteners 220 are self-tapping screws that form their own threads within their respective track. In another embodiment, the ends of the tracks are threaded and fasteners 220 are screwed into these threads.

Referring to FIG. 2A, lens housing 206 functions to house lens 207 for camera 200. Lens 207 functions to accept electromagnetic radiation from a scene (not explicitly shown) and to refract this radiation before it reaches a detector section of camera 200. Lens 207 may be formed from any suitable material and may be coupled to lens housing 206 in any suitable manner. Lens housing 206 couples to the front of housing 202 in any suitable manner; however, in the illustrated embodiment, lens housing 206 couples to housing 202 with a plurality of fasteners 226. In one embodiment, fasteners 226 are self-tapping screws that screw into respective tracks of first pair of tracks 216 and second pair of tracks 218. In other embodiments, the tracks have threads in their ends that accept threads of fasteners 226.

Referring to FIG. 2B, mounting device 210 adjustably couples to housing 202 to provide a flexible mounting scheme for system 100. Details of mounting device 210 are described below in conjunction with FIGS. 3B and 3C; however, generally, mounting device 210 includes a pair of protrusions 228 configured to engage either first pair of tracks 216 or second pair of tracks 218. Protrusions 228 may then slide within respective tracks 216 or 218 so that mounting device 210 may be positioned along the length of housing 210 as desired.

Figure 3A:
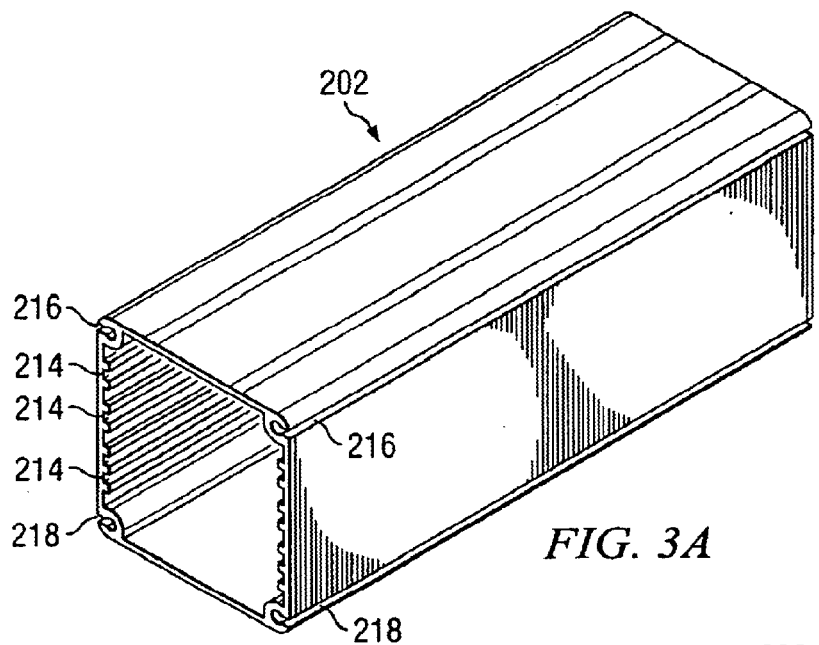
FIG. 3A is perspective view of an extruded camera housing in accordance with one embodiment of the present invention.

FIG. 3A is a perspective view of housing 202 in accordance with one embodiment of the present invention. In the illustrated embodiment, housing 202 is an extruded aluminum housing having a generally rectangular shape. However, housing 202 may be formed by any suitable manufacturing process, from any suitable material, and in any suitable shape. The size of housing 202 is dictated by the type of camera 200 utilized in system 100. In some embodiments, housing 202, with rear access cover 204 and lens housing 206 coupled thereto, is adapted to fit within an existing security camera enclosure so that the enclosure does not have to be changed when replacing an old security camera within that enclosure with system 100.

As illustrated in FIG. 3A, tracks 216 and 218 are formed along the length of housing 202; however, tracks 216 and 218 may only be formed at the front and rear ends of housing 202 or may be formed intermittently along the length of housing 202. If housing 202 is formed with an extrusion process, then track 216 and 218 is typically formed along the length of housing 202 because of the nature of the extrusion process. As described above, tracks 216 provide at least two separate functions, one of which is to couple rear access cover 204 and lens housing 206 thereto with fasteners 220 and 226, respectively. The other function is to work in conjunction with mounting device 210 to provide mounting flexibility for system 100. In this regard, mounting device 210, via protrusions 228, may be positioned anywhere along the length of housing 202 to facilitate a myriad of mounting positions, depending on the particular application for system 100.

First pair of tracks 216 may be associated with any particular side of housing 202 and, similarly, second pair of tracks 218 may be associated with any particular side of housing 202. However, in one embodiment, first pair of tracks 216 is associated with a top side of housing 202 and second pair of tracks 218 is associated with a bottom side of housing 202. This facilitates mounting device 210 being either on the top of housing device 202 so that it may be hung from a support, or being coupled to the bottom of housing 202 so that it may be coupled to a support that is underneath housing 202. This is described in further detail below in conjunction with FIG. 3D.

Figure 3B:
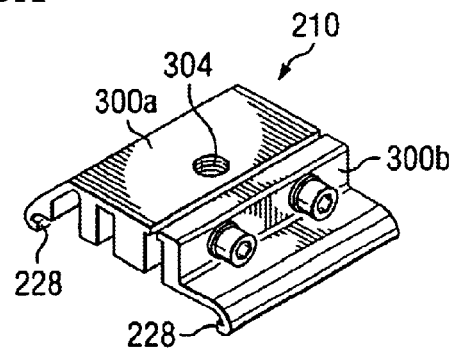
FIGS. 3B and 3C are perspective views of an adjustable mounting device in accordance with one embodiment of the present invention.
Figure 3C:
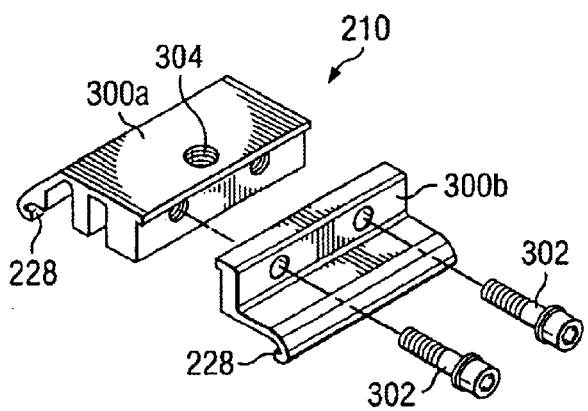

FIGS. 3B and 3C are perspective views of mounting device 210 in accordance with an embodiment of the present invention. In the illustrated embodiment, mounting device 210 is formed from two separate pieces, 300a, 300b and includes a pair of clamping screws 302 that couple pieces 300a and 300b together. This is facilitated by disposing clamping screws 302 through holes in piece 300b and threadably coupling clamping screws 302 to threaded holes formed in piece 300a. In addition to coupling pieces 300a, 300b together, clamping screws 302 function to secure mounting device 210 within either first pair of tracks 216 or second pair of tracks 218. This is described in further detail below in conjunction with FIG. 3D. Although illustrated as two separate pieces 300a, 300b in FIGS. 3B and 3C, mounting device 210 may alternatively be formed from any suitable number of pieces and, in one embodiment, may be formed from a single piece of material. In addition, any suitable number of fasteners 302 may be utilized.

As described above, mounting device 210 includes a pair of protrusions 228 that are configured to engage either first pair of tracks 216 or second pair of tracks 218. Mounting device 210 also includes a threaded mounting hole 304 formed in piece 300a or, alternatively, 300b.

Protrusions 228, as described above, are configured to engage either first pair of tracks 216 or second pair of tracks 218. Accordingly, protrusions 228 may have any suitable shape. In the illustrated embodiment, where mounting device 210 is formed from two separate pieces, one protrusion 228 is associated with piece 300a and the other protrusion 228 is associated with piece 300b.

Threaded mounting hole 304 may be any suitable mounting hole adapted to couple system 100 to either an existing or a new mounting screw. In a particular embodiment, threaded mounting hole 304 is a ¼-20 threaded mounting hole that is typical in the security camera industry for mounting security cameras. However, threaded mounting hole 304 may be any suitable size and may have any suitable thread arrangement.

Figure 3D:
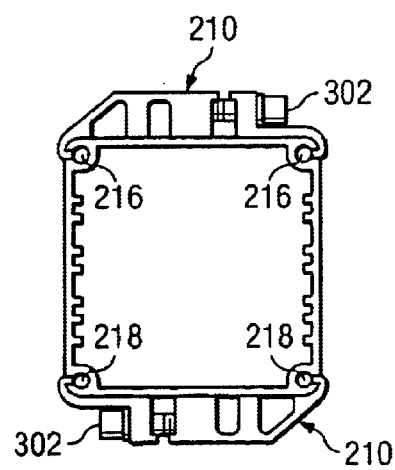
FIG. 3D is an elevation view of the extruded camera housing of FIG. 3A illustrating two different locations for the mounting device of FIG. 3B.

FIG. 3D is an elevation view of housing 202 illustrating two different locations for mounting device 210. As illustrated in FIG. 3D, mounting device 210 may either be coupled to the side of housing 202 that includes first pair of tracks 216 or may be mounted to the side of housing 202 that includes second pair of tracks 218. The location of mounting device 210 depends on the mounting scheme used for system 100 during installation. As can be seen in FIG. 3D, protrusions 228 of mounting device 210 are shown to be engaged with either first pair of track 216 or second pair of tracks 218. In addition, clamping screws 302 are shown to be coupling piece 300a to 300b in such a manner that mounting device 210 is secured in position on housing 202. In other words, clamping screws 302 are tightened in such a manner that protrusions 228 "grip" a side of housing 202. If an installer desired to move the position of mounting device 210, then he or she would simply loosen clamping screws 302 so that protrusions 218 would be able to slide along the tracks that protrusions 218 are engaged with.

In an embodiment of the present invention in which the old security camera is being replaced by the security camera system 100 of the present invention, an installer removes the old security camera from a mounting screw and proceeds to install system 100. Assuming that system 100 is fully assembled, the installer utilizes threaded mounting hole 304 to install system 100 on the existing mounting screw. The installer has the option of positioning mounting device 210 on either the top or bottom of housing 202 depending on where the mounting screw is located. In addition, the installer may loosen clamping screws 302 in such a manner that protrusions 228 are allowed to slide within either tracks 216 or tracks 218 so that housing 202 may be moved forward or rearward depending on the desired location of lens 207.

For example, if system 100 is being installed within an enclosure, it is desirable to place lens 207 very near the window of the enclosure because when detecting infrared radiation, lens 207 needs to be very close to the camera lens for proper operation. In this regard, installer is able to move housing forward or rearward before securing mounting device 210 in place within either tracks 216 or tracks 218. Once the installer obtained the desired location of mounting device 210 then he or she would tighten clamping screws 302 to secure mounting device 210 in its desired location. Because rear access panel 204 includes, in one embodiment, a twenty-four volt AC power input receptacle 222 and a BNC connector 224, the installer simply "plugs in" the existing power cord and video cable so that the camera system 100 is ready for use. This may be referred to as "plug-and-play" capability, which is desirable for ease of installation and reduced cost of replacing an old security camera.

Although embodiments of the invention and some of their advantages are described in detail, a person skilled in the art could make various alterations, additions, and omissions without departing from the spirit and scope of the present invention as defined by the appended claims.

What is claimed is:

1. A system, comprising:
   a generally rectangular camera housing;
   a first pair of tracks formed on the outside of the camera housing adjacent a first side of the camera housing;
   a second pair of tracks formed on the outside of the camera housing adjacent a second side of the camera housing;
   a thermal imaging camera disposed in the camera housing;
   a rear access cover coupled to a rear of the camera housing with at least one fastener coupled to a respective track of the first pair and second pair of tracks;
   a twenty-four volt AC power input receptacle coupled to the rear access cover;
   a BNC connector adapted for NTSC video output coupled to the rear access cover;
   a lens housing having a lens disposed therein coupled to a front of the camera housing with at least one fastener coupled to a respective track of the first pair and second pair of tracks; and
   a mounting device adapted to adjustably couple to the camera housing, the mounting device comprising a pair of protrusions configured to engage either the first pair or the second pair of tracks, the mounting device further comprising a ¼-20 threaded mounting hole formed therein configured to couple to a mounting screw.

2. The system of claim 1, wherein the mounting device is formed from two separate pieces and further comprises one or more clamping screws operable to couple the two pieces together and further operable to secure a position of the mounting device within either the first pair or the second pair of tracks.

3. The system of claim 1, further comprising a plurality of grooves formed in the inside of the camera housing, the plurality of grooves configured to engage one or more circuit boards associated with the thermal imaging camera.

4. The system of claim 1, wherein each track of the first and second pair of tracks is formed along the entire length of the camera housing.

5. The system of claim 1, wherein the system is adapted to fit within an existing security camera enclosure.

6. A system, comprising:
   a camera housing;
   a first pair of tracks formed on an outside of, and along a length of, the camera housing;
   a rear access cover configured to couple to a rear of the camera housing with at least one fastener configured to couple to a respective track of the first pair of tracks; and
   an adjustable mounting device comprising:
      a pair of protrusions configured to engage the first pair of tracks; and
      a threaded mounting hole formed therein configured to couple to a mounting screw.

7. The system of claim 6, further comprising:
   a twenty-four volt AC power input receptacle coupled to the rear access cover; and
   a BNC connector adapted for NTSC video output coupled to the rear access cover.

8. The system of claim 6, wherein the adjustable mounting device is formed from two separate pieces and further comprises one or more clamping screws operable to bring the two pieces in proximity to one another to secure a position of the adjustable mounting device within the first pair of tracks.

9. The system of claim 6, wherein the threaded mounting hole is a ¼-20 threaded hole.

10. The system of claim 6, further comprising a plurality of grooves formed in the inside of the camera housing, the plurality of grooves configured to engage one or more circuit boards associated with the camera.

11. The system of claim 6, further comprising a second pair of tracks formed on the outside of, and along the length of, the camera housing;

wherein the at least one fastener is configured to couple to the respective track of the first pair or second pair of tracks; and wherein the pair of protrusions is configured to engage either the first pair or the second pair of tracks.

12. A system, comprising:

a generally rectangular camera housing formed from a single piece of material;

a first pair of generally circular tracks formed on the outside of, and along the length of, the camera housing adjacent a first side of the camera housing;

a second pair of generally circular tracks formed on the outside of, and along the entire length of, the camera housing adjacent a second side of the camera housing; and a mounting device comprising:

a pair of protrusions configured to engage respective tracks of either the first pair or the second pair of tracks;

a threaded mounting hole configured to couple to a mounting screw; and a clamping screw operable to selectively secure a position of the housing when the pair of protrusions are engaged with the respective tracks and the threaded mounting hole is coupled to the mounting screw.

13. The system of claim 12, wherein the mounting device further comprises a ¼-20 threaded mounting hole formed therein configured to couple to a mounting screw.

14. The system of claim 12, further comprising:

a rear access cover coupled to a rear of the camera housing;

a twenty-four volt AC power input receptacle coupled to the rear access cover; and a BNC connector adapted for NTSC video output coupled to the rear access cover.

15. The system of claim 14, wherein the rear access cover is coupled to a rear of the camera housing with a plurality of fasteners coupled to respective tracks of the first pair and second pair of tracks.

16. The system of claim 12, further comprising a thermal imaging camera disposed in the camera housing.

17. The system of claim 16, further comprising a plurality of grooves formed in the inside of the camera housing, the plurality of grooves configured to engage one or more circuit boards associated with the thermal imaging camera.

* * * * *